United States Patent [19]
Gjullin et al.

[11] Patent Number: 5,630,035
[45] Date of Patent: May 13, 1997

[54] METHOD OF SAMPLING A TERRAIN DATA BASE

[75] Inventors: Robert M. Gjullin, Corrales; Douglas E. Thorpe, Albuquerque, both of N.M.

[73] Assignee: Honeywell Inc., Minneapolis, Minn.

[21] Appl. No.: 183,533

[22] Filed: Jan. 18, 1994

[51] Int. Cl.$^6$ .................... G06F 15/00; G05D 1/00
[52] U.S. Cl. .................................................. 395/127
[58] Field of Search ................................ 395/121, 123, 395/125, 127, 130; 364/443, 423, 458; 340/988, 995

[56] References Cited

U.S. PATENT DOCUMENTS 3,071,873  1/1963  Zahner et al.
4,899,293  2/1990  Dawson et al. .................... 395/123

OTHER PUBLICATIONS

Thompson et al., "Digital Terrain Analysis Station (DTAS)", Dept. of Army Unclassified Report No. ETL-R040, Aug. 28, 1982.

*Primary Examiner*—Mark K. Zimmerman
*Assistant Examiner*—Joseph R. Burwell
*Attorney, Agent, or Firm*—Kenneth J. Johnson

[57] ABSTRACT

A convergence model is shown and described for accommodating variation in data post spacing in a digital terrain elevation database (DTED) based on longitude and latitude address values for data posts. Under such a database structure, data posts lying along lines of latitude vary in spacing according to latitude, and converge at the poles with zero spacing therebetween. To scan a circular region of data posts relative to a given data post, e.g., a threat installation, this variation in data post spacing is considered by appropriately scaling sample step spacing along radials traversed in executing a radial spoke scan pattern. In this manner, a circular region of data posts surrounding a given data post may be sampled using simple, dedicated hardware despite this variation in data post spacing.

3 Claims, 3 Drawing Sheets

METHOD OF SAMPLING A TERRAIN DATA BASE

GOVERNMENT RIGHTS

The Government has rights in this invention pursuant to Contract No. F33600-88-G-5107, awarded by the Department of the Air Force.

BACKGROUND OF THE INVENTION

The present invention relates generally to use of digital terrain elevation data (DTED), and particularly to a method of sampling digital terrain elevation data.

Digital terrain elevation data represents surface altitude at discrete "data posts." Each data post has a surface location or address, e.g., latitude and longitude, and an associated altitude, e.g., vertical offset relative to sea level. Thus, a simple form of a DTED database would deliver a scaler altitude in response to longitude and latitude input. More complicated DTED databases have been developed for certain applications. For example, U.S. Pat. No. 4,899,293 issued Feb. 6, 1990 to J. F. Dawson and E. W. Ronish shows a tessellation method for creating a spherical database by warping a digital map, including digital terrain elevation data, by longitude and latitude parameters.

DTED database systems are used in flight mission computer systems and flight planning strategy in military applications to aid in, for example, covert and evasive flight operations. As used in mission computer systems, a DTED database can aid a pilot in time-critical maneuvers or in selecting evasive routes with respect to a given threat position. Such threat positions may be known in advance and stored in the DTED database, or detected while in flight. The computation speed and accuracy required in accessing and calculating routes or alternatives based on DTED can be vitally critical, especially for computations executed repeatedly to keep a pilot fully appraised of current terrain conditions and route alternatives. Thus, improvements in methods of accessing DTED and computations based on extracted DTED are not simply improvements in computational elegance, but can be life-saving and critical to mission success.

There is often a need to perform sampling of a DTED database in a circular area surrounding a given point. Terrain masked threat intervisibility calculation is one example wherein a threat position is identified and a circular region surrounding the threat position is defined by the range capability of the threat. As may be appreciated, it is important to accurately extract a collection of DTED samples reflecting the actual range capability of the threat, i.e., extract a true circular data post pattern. Complete data post visitation or sampling of all data posts corresponding accurately to the circular threat range capability must be guaranteed.

As discussed more fully hereafter, the DTED database as applied to simple, dedicated hardware devices complicates the task of accurately extracting data posts within a circular region. More particularly, according to a prevailing data post model, i.e., that of U.S. Pat. No. 4,899,293 cited above, data post spacing is constant in the vertical direction along meridians or lines of longitude, but varies as a function of latitude, in the horizontal direction along parallels or lines of latitude. In other words, at latitudes near the poles data post spacing along lines of latitude is substantially less than post spacing along lines of latitude near the equator. Thus, data post spacing inconsistency or convergence complicates the task of extracting a circular pattern from a DTED database.

Hardware devices proposed for use in executing such circular scan patterns relative to a DTED data cache, are simple, dedicated calculating engines imposing certain limitations on methods of executing the scan. For example, a constant radius and number of samples taken along each radial is typically required throughout the circular scan. This imposes a particularly troublesome requirement when attempting to scan a circular region from a database having variable data post spacing with such simple, dedicated scanning engine.

SUMMARY OF THE INVENTION

The present invention provides a convergence model for appropriately scanning a circular region of a DTED database when that database incorporates variation in data post spacing along lines of latitude as a function of latitude. The present invention finds application primarily in radial scanning methods wherein a circular region is sampled by tracing along radials emanating from a given data post. Under such radial scanning methods, fixed delta X and delta Y values are established for each radial traversed and a fixed number of steps are taken along each radial to reach a specific radius corresponding to, for example, a threat installation range capability. When applied to a DTED database having variation in data post spacing along lines of latitude as a function of latitude, however, such method of radial scanning results in sampling of an elliptical region surrounding the point of interest, and such elliptical region does not accurately reflect the range capability of the threat installation.

The present invention provides a method of scaling the delta X and delta Y values as a function of latitude in a simple, dedicated hardware engine so that a fixed number of steps may be taken along each radial traversed, but suitably scan a circular region of the database. Under the preferred embodiment of the present invention, a latitude input selects among sets of precalculated delta X and delta Y values stored, for example, in a lookup table indexed by the latitude input. A circular sample region thereby results from a constant number of fixed magnitude delta X and delta Y steps taken along each radial. The sampling method of the present invention can be implemented in a simple dedicated hardware engine, yet provide accurate, i.e. circular, sampling corresponding to circular range capability of a threat.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
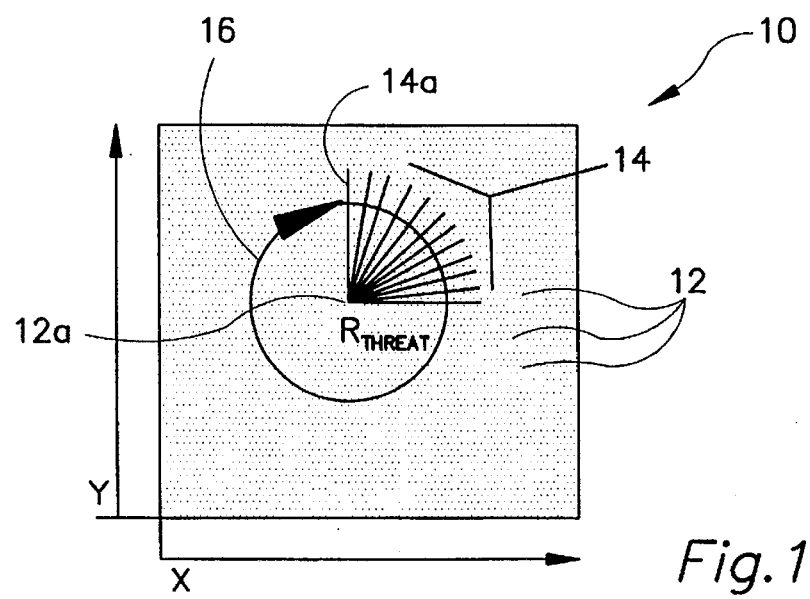
FIGS. 1–3 illustrate a method and apparatus for radial scanning under which the present invention may be implemented.

The preferred embodiment of the present invention as illustrated in the drawings comprises generally a convergence model for use in extracting a collection of DTED data posts occupying a circular region centered about a given point of interest wherein the DTED database has variation in spacing between data posts. The preferred embodiment of the present invention is best suited for use in radial scanning hardware using a predetermined delta X and delta Y values when tracing along a given radial spoke. In accordance with the present invention, the radial scan hardware receives a latitude input parameter subdividing a given latitude zone, e.g., temperate zone, into sub-zones. Using the latitude input, the radial scan hardware approximates the required delta X and delta Y to trace a given radial and account for post spacing in the particular sub-zone and thereby suitably extract or sample a circular pattern of data posts.

In FIG. 1, a data cache 10 contains a relevant portion of a DTED database comprising a plurality of data posts 12 individually addressable according to a two-dimensional, i.e., X and Y, addressing scheme. In particular, the DTED database is addressable by latitude and longitude values. In execution of a radial scan intervisibility calculation, a threat installation is identified at the data post 12a with a given range capability indicated as $R_{threat}$. In the illustrated example, the distance $R_{threat}$ corresponds to 146 data posts 12. A radial scan is then executed by taking data samples at data posts 12 along a set of radials 14 originating at the threat position 12a and extending a distance corresponding to $R_{threat}$, i.e., extending 146 data posts from the data post 12a. Unfortunately, data post spacing along lines of latitude varies as a function of latitude, converging to no spacing at the north and south poles. Accordingly, extending a radial scan a fixed number of data posts out from data post 12a does not correspond to a circular region surrounding data post 12a due to the latitude dependent variation in data post spacing. Furthermore, the method of radial scanning executed by the architecture of FIG. 1 is not suited for variation in the number of data posts sampled along a given radial, i.e., requires a fixed number of steps or samples along each radial.

Figure 2:
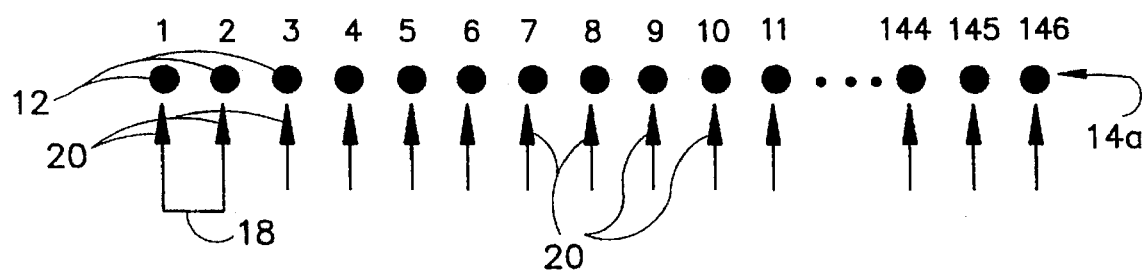

In FIG. 2, a sample step 18 corresponds to the spacing between data posts 12 along vertical radial 14a, i.e., parallel to the y axis as indicated in FIG. 1. Thus, as each sample 20 is taken from the data cache 10 an intervisibility calculation may be performed. The angular increment between radials 14 is selected, taking into account the magnitude of step 18, to assure complete data post 12 visitation throughout the circular range capability of the threat at the data post 12a.

Figure 3:
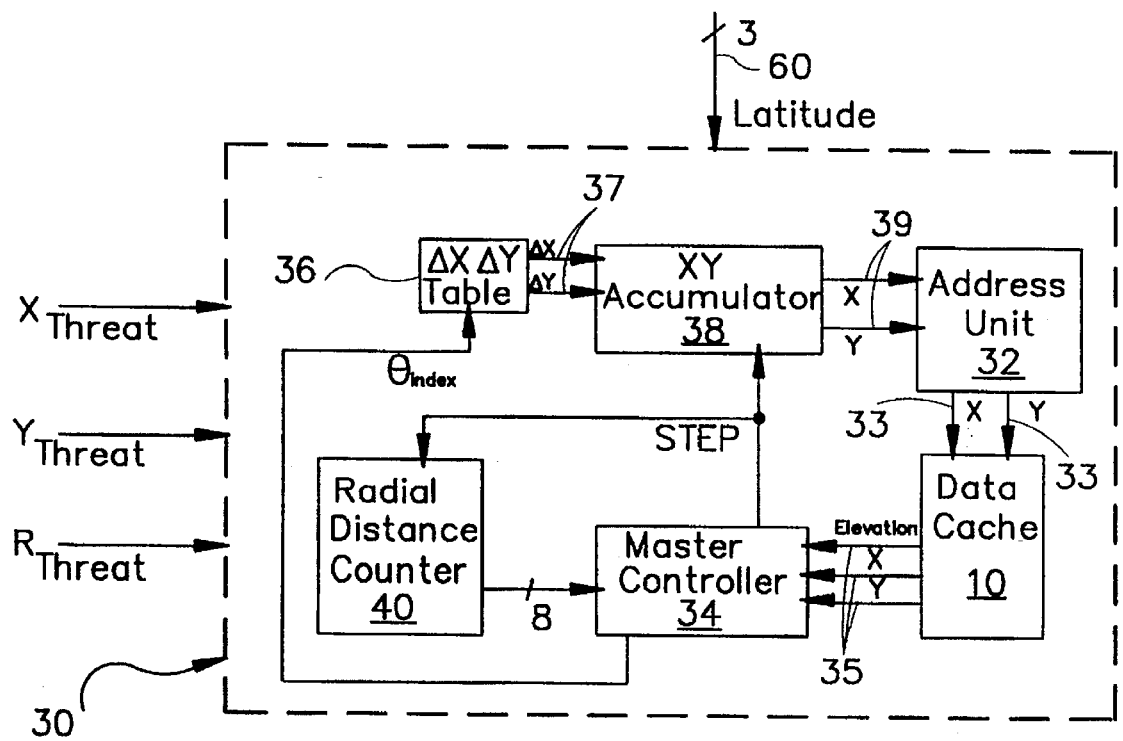

FIG. 3 illustrates generally the hardware implementation of a simple, dedicated radial scanner 30 well suited for rapid intervisibility calculation. Radial scanner 30 receives threat related information identifying a threat installation position, i.e., $X_{threat}$ and $Y_{threat}$, and its range capability, i.e., $R_{threat}$. Data cache 10 is accessed by way of address unit 32 providing X and Y address values 33 corresponding to the data posts 12 within cache 10. Data cache 10 in turn provides intervisibility data 35, including X and Y location values and an elevation value for each data post 12 addressed by address unit 32. Master controller 34 selects a suitable angular increment between radials 14 to accomplish complete data post visitation as a function of the magnitude of the value $R_{threat}$ and step 18. A 360° scan 16 is accomplished by sequentially scanning along the length of each of a plurality of radials 14 separated by this angular increment.

Segments of a 360° scan 16 may be executed by scanning only selected radials 14. The angular orientation of each radial 14 traversed is indicated in some fashion to a delta XY lookup table 36, in the illustrated example the control input $\theta_{index}$ is applied to delta XY look up table 36. Based on this angular orientation, look up table 36 provides delta X and delta Y values 37 required to sample along the current radial 14 at increments of sample step 18. An XY accumulator 38 sums a series of delta X and delta Y values for application as address values 39 to address unit 32. As may be appreciated, the values presented to and stored in XY accumulator 38 are high precision scaled integers representing real number values whereas the XY values 39 provided to address unit 32 by XY accumulator 38 are truncated to provide suitable integer address values, i.e., corresponding to latitude and longitude, for application to data cache 10. A radial distance counter 40 monitors the progress along each radial 14, i.e., counts steps 18, and allows master controller 34 to detect when a complete scan along one of radials 14 is completed. After each radial 14 is scanned, a new $\theta_{index}$ is applied to the table 36, the counter 40 is reset, and scanning is executed along the next radial 14.

From the description thus far it should be clear that for a DTED database having consistent data post spacing in the X and Y directions, the scanner 30 would appropriately extract a circular pattern of data posts 12 for intervisibility calculation.

For a DTED database having converging data post 12 spacing, however, the above scanning hardware 30, as described thus far, would undesirably extract an elliptical pattern of data posts 12 surrounding the threat at data post 12a. In accordance with the present invention, scanning hardware 30 appropriately extracts a circular pattern of data post 12 surrounding data post 12a by scaling of the delta X and delta Y values applied to the XY accumulator 38 as a function of latitude. Thus, implementation of the present invention relates to the information stored in look up table 36 and how that information is accessed, i.e., indexed, as a function of latitude in addition to angular orientation of the radial to be traversed.

The scanning hardware 30 includes a three bit latitude input 60 dividing the temperate zone into eight sub-zones. The following table defines eight sub-zones of the temperate zone:

| TEMPERATE SUB-ZONE DEFINITION | | | | |
|---|---|---|---|---|
| ZONE | LOWER LATITUDE | UPPER LATITUDE | HORIZONTAL SPACING AT ZONE CENTER | VERTICAL SPACING |
| 0 | 30.00 DEG | 32.75 DEG | 878 M | 801 M |
| 1 | 32.75 DEG | 35.50 DEG | 851 M | 801 M |
| 2 | 35.50 DEG | 38.25 DEG | 822 M | 801 M |
| 3 | 38.25 DEG | 41.00 DEG | 792 M | 801 M |
| 4 | 41.00 DEG | 43.75 DEG | 759 M | 801 M |
| 5 | 43.75 DEG | 46.50 DEG | 725 M | 801 M |
| 6 | 46.50 DEG | 49.25 DEG | 690 M | 801 M |
| 7 | 49.25 DEG | 52.00 DEG | 652 M | 801 M |

Since the database converges, i.e., lines of longitude converge at poles and post spacing on lines of latitude goes to zero at the poles, the incremental steps delta X and delta Y along the radial being traversed are scaled to scan the appropriate shape out of cache 10. Such scaling is accomplished as follows:

$dx = X_s \cdot \cos(\theta)$ $dy = Y_s \cdot \sin(\theta)$ where theta represents the angular orientation of the radial 14 to be traversed, $X_s$ and $Y_s$ scale as a function of data post 12 spacing in the current sub-zone as taken from the above table, and dx and dy correspond to delta X and delta Y values, respectively, taken from lookup table 36.

The general equations for the terms $X_s$ and $Y_s$ are as follows:

$$X_s = \frac{\text{minimum horizontal post spacing}}{\text{actual post spacing at the center of a given sub-zone}}$$

$$Y_s = \frac{\text{minimum horizontal post spacing}}{\text{actual vertical spacing}}$$

The numerators of $X_s$ and $Y_s$ serve to modify the step size to be uniform in both the horizontal and vertical directions so that the radius under consideration appears constant for the purposes of the earth curvature correction and the accumulated distance calculation. The denominators of $X_s$ and $Y_s$ serve to calibrate the step size in both directions to scan the required circular area.

The above table thereby provides appropriate information for calculating $X_s$ and $Y_s$ throughout the temperate zone by taking into account each sub-zone thereof. Having sets of values for $X_s$ and $Y_s$ as a function of latitude, the values delta X and delta Y may be calculated in sets of eight as a function of latitude, i.e., one set for each sub-zone. To suitably access delta X and delta Y values from table 36 according to current latitude, the latitude input 60 may be used as an address offset within table 36 to draw appropriate delta X and delta Y values 37 as a function of radial angular orientation and current sub-zone latitude.

Due to the nature of the DTED database typically under consideration herein, e.g., that of U.S. Pat. No. 4,899,293 the equatorial and polar latitudes require elliptical scans which are merely subsets of those defined above for the temperate zone, therefore, this solution may be applied everywhere within the DTED model of earth. More particularly, the equatorial latitudes are divided into four sub-zones corresponding to, i.e., having identical horizontal spacing at zone center values, sub-zones 2, 3, 4, and 5 of the temperate sub-zones as set forth in the above table where sub-zone 2 corresponds to equatorial latitude range 0 degrees to 11.05 degrees, sub-zone 3 corresponds to equatorial latitude range 11.05 degrees to 19.31 degrees, sub-zone 4 corresponds to equatorial latitude range 19.31 to 25.36 degrees, and sub-zone 5 corresponds to equatorial latitude range 25.36 degree to 30.00 degrees. Similarly, the polar latitudes are divided into five sub-zones corresponding to sub-zones 2, 3, 4, 5 and 6 of the above temperate sub-zones where sub-zone 2 corresponds to polar latitude range 78.95 degrees to 90.00 degrees, sub-zone 3 corresponds to polar latitude range 70.69 degrees to 78.95 degrees, sub-zone 4 corresponds to polar latitude range 64.64 degrees to 70.69 degrees, sub-zone 5 corresponds to polar latitude range 59.43 degrees to 64.64 degrees, and sub-zone 6 corresponds to latitude range 52.00 degrees to 59.43.

Figure 4:
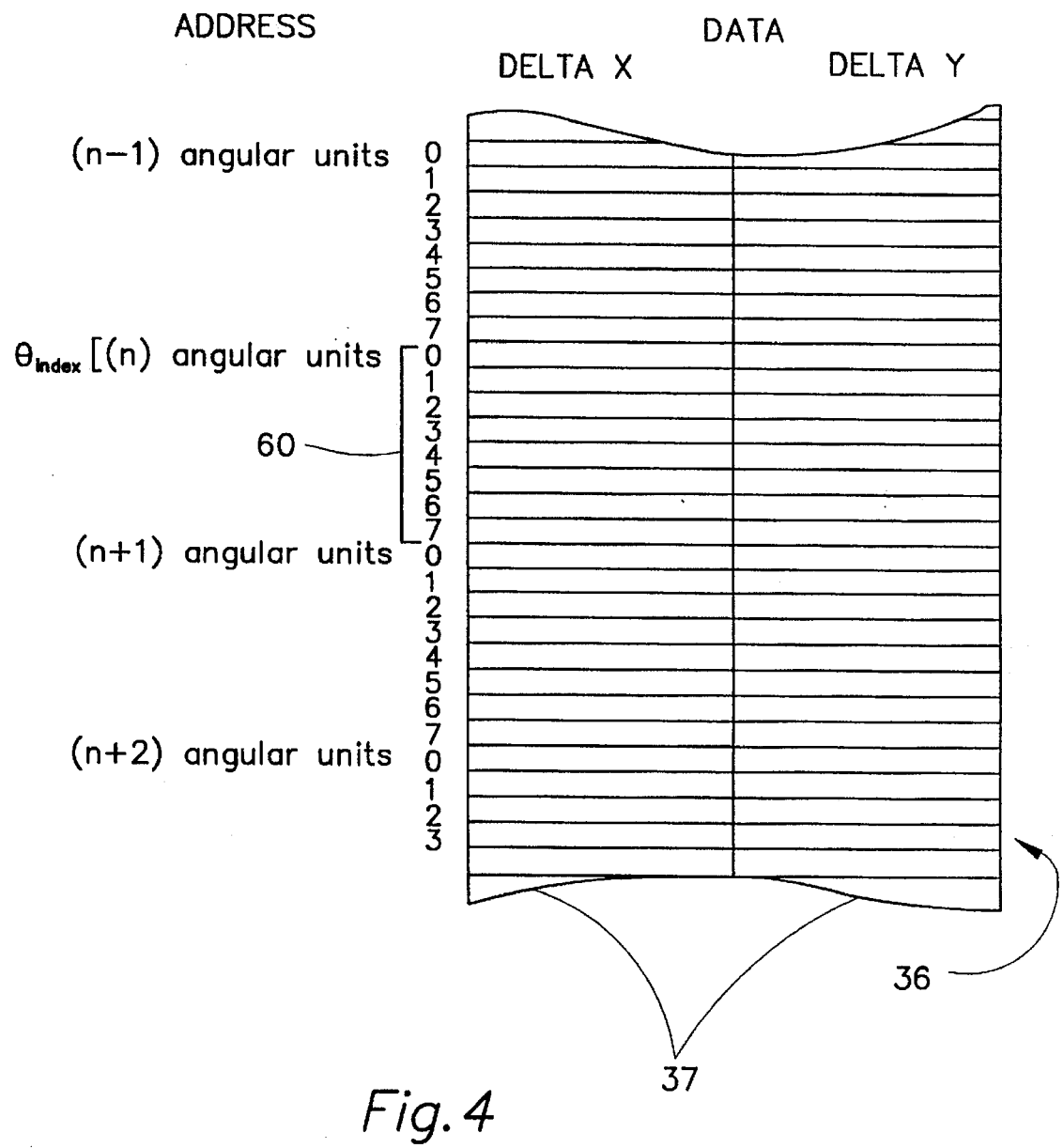
FIG. 4 illustrates a lookup table employed in the radial scanning hardware of FIG. 3 and incorporating the convergence model of the present invention.

With reference to FIG. 4, the angular orientation $\theta_{index}$ of a given radial selected for traversal identifies, for the temperate zone, a set of eight delta X and delta Y values. The latitude input 60 then provides a basis for selecting one pair of delta X and delta Y values. The address value applied to delta XY lookup table 36 is then a composite of the $\theta_{index}$ angular orientation of the radial to be traversed and the latitude input 60, e.g., latitude input 60 as an address offset relative to a $\theta_{index}$ base address expressed as angular units of radial orientation. As a result, the delta X and delta Y values 37 applied to accumulator 38 provide appropriate sampling along the particular radial 14 taking into account the local data post 12 spacing to reach a constant radial length, and therefore a circular sample region, with a constant number of steps or samples taken along each radial traversed. For the polar and equatorial latitudes a similar procedure is used, but fewer sub-zones are needed. These operational characteristics allow convenient implementation in the simple, dedicated architecture of the scanning hardware 30 of FIG. 3 by loading suitable values into lookup table 36 and indexing appropriately into table 36 as a function of an appropriate latitude sub-zone and radial angular orientation. As may be appreciated, latitude input 60 may be modified in its application to scanner 30 to account for an appropriate one of the sub-zones of the eight available sub-zones. For example, latitude input 60 would designate sub-zone 3 of the temperate zone when the current latitude is between 11.05 degrees and 19.31 degrees in the equatorial latitudes. Thus, processing apparatus exterior of scanner 30 would perform the task of selecting an appropriate one of the eight available sub-zones as a function of the current position within one of the temperate, equatorial, or poler zones.

An improvement in DTED database scanning has been shown and described. The method of the present invention compensates for a DTED database having variation in data post spacing, specifically in variation along lines of latitude as a function of latitude. The present invention provides a scan or sampling pattern as a function of current sub-zone latitude to account for data post spacing as a function of latitude. The present invention advantageously integrates well into existing simple, dedicated hardware designs for executing radial scan patterns. Accordingly, the present invention finds great utility for its ease of integration into existing DTED database systems and its improvement in accuracy with respect to selecting or sampling data posts 12 residing within a circular region surrounding a threat under consideration.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

What is claimed is:

1. A method of providing intervisibility calculations for known terrain using a computer comprising the steps of:

providing a digital terrain elevation data (DTED) database which models the known terrain and has data posts corresponding to points on the known terrain, the data posts being individually addressable in X and Y dimensions wherein spacing between adjacent terrain points varies as a function of at least one of said X and Y dimensions;

identifying a threat data post by X and Y dimension values;

identifying a set of radials of length corresponding to said constant radius and emanating from said threat data post;

dividing said at least one of said X and Y dimensions into a plurality of sub-zones and for each sub-zone identifying a data post spacing value in said X and Y dimensions corresponding to terrain point spacing therein;

traversing at least one of said radials by identifying a plurality of delta X and delta Y value pairs based on an angular orientation of said at least one radial, said plurality of delta X and delta Y value pairs are scaled according to said plurality of sub-zones, further identifying a given delta X and delta Y value pair from said plurality of sub-zones according to said threat post X and Y dimension values, and successively sampling along said at least one radial by successively accumulating said given delta X and delta Y values to identify successive sample points along said at least one radial whereby sampling at a given number of said successive sample points provides sampling along said at least one radial to said given length; and calculating intervisibility of the sample points with respect the threat point.

2. A method of providing intervisibility calculations for known terrain using a computer comprising the steps of:

providing a digital terrain elevation data (DTED) database which models the known terrain and has data posts corresponding to points on the known terrain, where the DTED database has data posts addressable in X and Y dimensions, each data post corresponding to the points on the known terrain, spacing between adjacent terrain points in the X dimension being variable as a function of the Y dimension of the adjacent data posts;

identifying an X dimension terrain point spacing for each of a plurality of X dimension sub-zones;

maintaining a table of delta X and delta Y value pairs, said table grouping said delta value pairs according to a plurality of given angular orientations, each group of delta value pairs corresponding to one of said angular orientation, each member of each group corresponding to one of said sub-zones;

selecting a threat data post having both a threat X address value and a threat Y address value;

selecting at least one radial emanating from said threat data post and defining a given angular orientation;

selecting a delta value pair as a function of said given angular orientation and said threat Y address value, where said threat Y address value corresponds to one of said sub-zones;

sampling along said at least one radial at a given number of sample points by successive accumulation of delta X and delta Y values of said selected delta value pairs whereby sampling occurs along said at least one radial; and calculating intervisibility of the sample points with respect the threat point.

3. A method according to claim 2 wherein said X dimension terrain point spacing for each of a plurality of X dimension sub-zones is a function of data post spacing at the center of each sub-zone.

* * * * *